United States Patent [19]

Crittenden et al.

[11] 4,114,451

[45] Sep. 19, 1978

[54] MOVING COIL MINIATURE ANGULAR RATE SENSOR

[75] Inventors: Jack H. Crittenden, Ontario; Joseph W. Bitson, Chino, both of Calif.

[73] Assignee: General Dynamics Corporation, Pomona, Calif.

[21] Appl. No.: 823,580

[22] Filed: Aug. 11, 1977

[51] Int. Cl.² ............................................. G01P 9/02
[52] U.S. Cl. ........................................ 73/504; 73/505; 74/5 R
[58] Field of Search ............... 73/504, 505, 516 R, 73/517 A; 74/5 R, 5.7

[56] References Cited

U.S. PATENT DOCUMENTS

| 1,408,110 | 2/1922 | MacGahan | 73/517 R |
| 2,657,353 | 10/1953 | Wiancko | 73/497 X |
| 2,815,584 | 12/1957 | Watson | 73/504 |
| 3,001,407 | 9/1961 | Wianko et al. | 73/497 |
| 3,078,728 | 2/1963 | Schlesman | 74/5 |
| 3,259,890 | 7/1966 | Wood | 73/517 R |
| 3,664,175 | 5/1972 | Pierson | 73/517 R X |

FOREIGN PATENT DOCUMENTS 713,550  8/1954  United Kingdom ................ 73/516 R Primary Examiner—James J. Gill
Attorney, Agent, or Firm—Neil F. Martin; Edward B. Johnson

[57] ABSTRACT

A steering rate sensing device for rolling air frames includes a base member for attachment to the air frame, a magnetic member fixed to the base member, and a pick up coil pivotally mounted to the base in close proximity to the magnet such that movement of the coil relative to the magnet generates a signal proportional to the steering rate of the rotating body.

17 Claims, 6 Drawing Figures

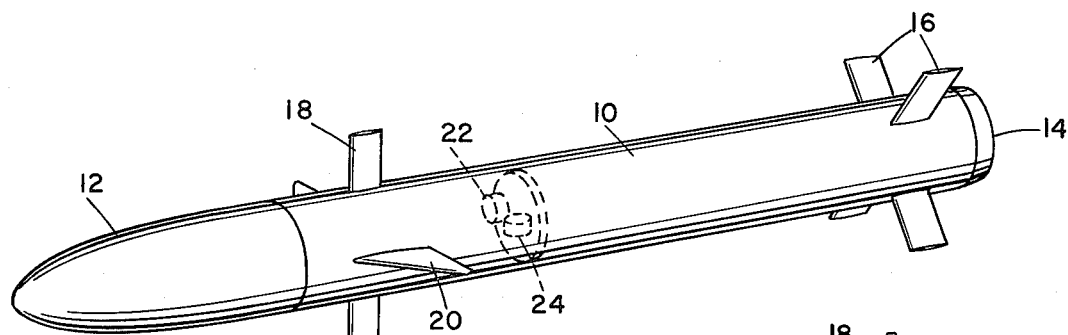
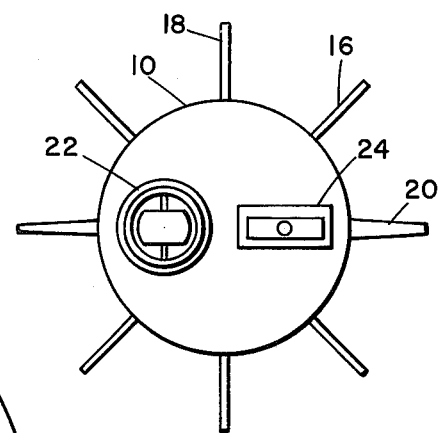
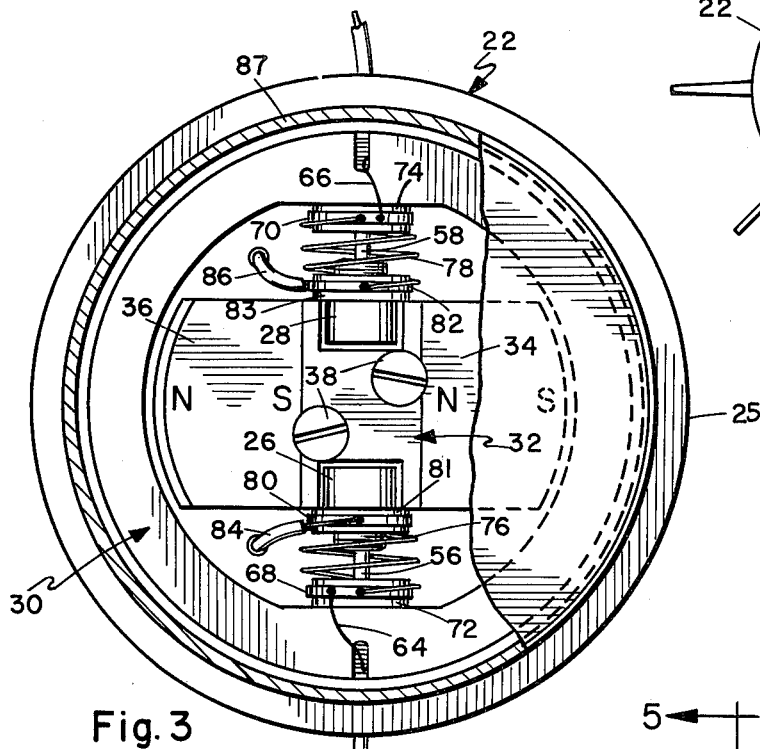

MOVING COIL MINIATURE ANGULAR RATE SENSOR

BACKGROUND OF THE INVENTION

The present invention relates to control mechanisms and pertains particularly to a steering rate sensing device for use in rotating air frames.

Many missiles have been designed for intentionally induced and maintained roll rates about their longitudinal axes during flight. Such missiles have significant and practical advantages over roll stabilized air frames. This rolling air frame concept has been applied to both air and surface launched missiles. These missiles can be spun up initially by the launcher and utilize control surfaces to maintain a predetermined rate of roll. With a roll rate of approximately 5 to 15 revolutions per second, it is possible to utilize a single control plane to guide the missile in all three earth related axes.

In a typical application of this concept, as disclosed in U.S. Pat. No. 4,037,806, the control system utilizes a single pair of variable incidence control surfaces to steer the missile about the control plane at a selected instantaneous rotational orientation upon command from a guidance command signal. Thus with such a missile operating in a level flight attitude, to cause the missile to climb, a guidance command signal must vary in amplitude at a frequency equal to the roll rate of the missile. For example, in the vertical plane, the guidance command signal would be generally sinusoidal wave form that would induce pitch-up as the control plane of the vehicle approaches earth vertical and pitch-down after the control surface rotates and nearest a one half revolution from pitch-up, thereby producing upward change in angle of attack. The angle of attack produces a body lift and alters the missile course from a horizontal to a climbing course. Similarly, a course change to the right would be effected by a sinusoidal signal displaced 90° from the signal required for a vertical course change. This provides a simplified control system resulting in a reduction in cost and increase in reliability for rolling air frames as opposed to stabilized air frames.

The present invention was conceived and developed for utilization in a recently developed autopilot control system for rolling air frames. Such autopilot is disclosed in application Ser. No. 637,565, filed Dec. 4, 1975, by Donald R. Cole, entitled "Rolling Air Frame Autopilot", now U.S. Pat. No. 4,008,00, and assigned to the assignee hereof. Heretofore no adequate control devices have been available for use in such autopilot systems for rolling air frame systems.

It is therefore desirable that suitable steering rate sensing devices be available which are simple and effective for use in autopilot systems for rolling air frames.

SUMMARY AND OBJECTS OF THE INVENTION

It is therefore the primary object of the present invention to overcome the above problems of the prior art.

Another object of the present invention is to provide a steering rate sensing means for use in rolling air frames.

Another object of the present invention is to provide a simple and effective steering rate sensing device for use in the control system of a rolling air frame.

In accordance with the primary aspect of the present invention, a steering rate sensing device for use in rolling air frames includes a base member having magnetic means mounted on the base member, and a sensing coil surrounding the magnetic member pivotally mounted to the base member for relative movement between the magnetic member and the sensing coil upon deviation of the device from its axial orientation during rotation thereof.

BRIEF DESCRIPTION OF THE DRAWINGS

The above and other objects and advantages of the present invention will become apparent from the following description when read in conjunction with the drawings, wherein:

FIG. 1 is a perspective view of a typical missile incorporating the moving coil sensor.

FIG. 2 is a diagrammatic view showing the sensor orientation in the missile.

FIG. 3 is a front view of the sensor with part of the cover cut away.

FIG. 4 is a side elevational view, partially broken away, of the sensor of FIG. 3.

DETAILED DESCRIPTION OF A PREFERRED EMBODIMENT

Figure 5:
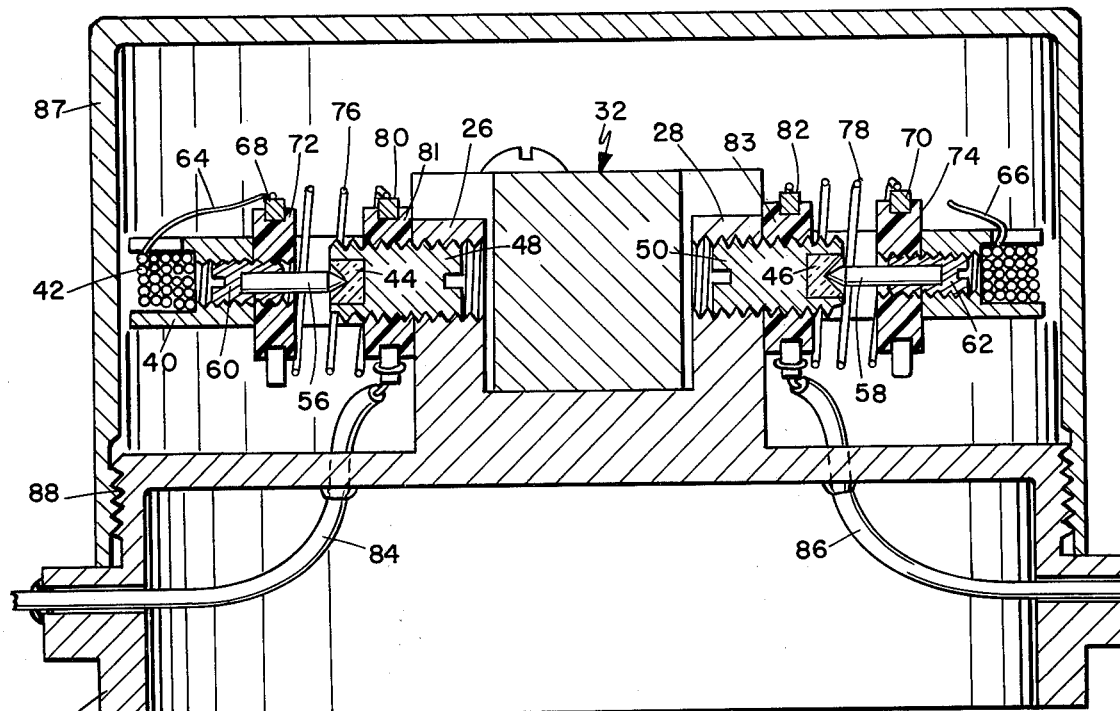
FIG. 5 is a sectional view taken on line 5—5 of FIG. 4.

Turning now to FIG. 1 of the drawing, a typical example of a rolling air frame is illustrated in the form of a missile. The air frame comprises a generally elongated cylindrical body 10, having an aerodynamically shaped nose 12 and tail end 14 from which thrust from a rocket engine or the like emerges. The body is provided with a plurality of roll inducing fins or surfaces 16 near the tail end thereof for inducing and/or maintaining a roll in the body about its longitudinal axis. The device is also provided with a pair of fixed incidence canard surfaces 18 and a pair of variable incidence canard surfaces 20. The canard surfaces 20 may be rotated to positive and negative angles of incidence by a suitable control system, such as disclosed in the aforementioned application, Ser. No. 637, 565. The canard surfaces 20 control attitude in a plane passing through the longitudinal axis of the missile and perpendicular to the axis of rotation of the control surfaces. This plane is referred to as the control plane. References to up or down on the control plane are vehicle related directions. The control system for the air frame includes a steering rate sensor 22 and an accelerometer 24.

The roll inducing surfaces 16 together with an initial spin-up of the missile provided by the launcher results in a roll rate about the longitudinal axis of approximately 10 revolutions per second. Steering control of the air frame is accomplished by varying the incidence of the control surfaces 20 in a cyclical manner to correspond to the instantaneous position of the control plane. For example, with the vehicle negotiating a horizontal flight path and if it is desired to cause the vehicle to be steered in a curved path to the left, the control surfaces 14 are given a positive angle of attack which is at a maximum when the up section of the control plane is in the left 180° of rotation. Ignoring control reaction delay, the positive incident angle reaches a maximum as the control plane is at the earth related horizontal (the vehicle related up section of the control plane to the left). During the next 90° of rotation the positive incidence of the control surface is reduced to zero and in the succeeding 90° of rotation is moved to a negative angle of attack reaching a maximum when the control plane is again horizontal with the vehicle related up section to the left. The movement of the control surfaces 20 corresponds to a sinusoidal variation with a frequency equal to the roll rate and with the relative phase determined by the direction of the desired correction.

Turning now to FIG. 2 of the drawing, there is illustrated an angular rate sensor 22 and an accelerometer 24 mounted on an airframe. The accelerometer 24 is mounted on the air frame with its sensitive axis lying in the control plane, but inverted relative to the air frame vertical so that the accelerometer produces a signal corresponding to acceleration in the control plane but with the opposite sense.

As best seen in FIGS. 3 through 5, the angular rate sensor 22 hereinafter described as a steering rate sensor, in accordance with the preferred embodiment of the invention, comprises a base member 25 constructed of any suitable material. The base member includes a pair of spaced apart trunion support members 26 and 28 for mounting the support bearings of a pivotally mounted induction coil designated generally by the numeral 30. The magnet support member 32 is preferably in a generally H-shaped configuration having a pair of generally rectangular slots for receiving the trunion support members 26 and 28. The magnet support member 32 is made of a magnetic steel and provides a low reluctance path between permanent magnets 34 and 36. The permanent magnets 34 and 36 are bonded to the magnet support member as shown in FIG. 3. The cover 87 is made of magnetic material which in addition to protecting the sensor; (1) aids in providing high flux density in the air gap between the magnets and cover, and (2) provides magnetic shielding of the sensor. The magnet support member may be secured to the base in any suitable manner, such as by means of screws 38 as illustrated.

The induction or pickoff coil 30 comprises a generally annular spool like member 40 having a plurality of coils of wire 42. The spool can be constructed of any suitable material such as aluminum.

The entire steering sensing apparatus is designed to rotate with the air frame with the axis of the steering apparatus parallel with the axis of the air frame in a preferred embodiment. Thus, the moving pivotal coil can be considered a rotor. This coil assembly is pivotally mounted for pivotal movement about an axis which intersects and is 90° to the control axis of the rotating body.

The coil assembly 30 is mounted on pivotal means on the trunion support members 26 and 28 by means of a pair of jeweled bearings 44 and 46 mounted in screw members 48 and 50 which in turn are threaded through the trunion supports 26 and 28. A pair of adjustable pins 56 and 58 having conical points for engagement with conical depressions in the bearings 44 and 46 are mounted by suitable threaded members or screws 60 and 62 in the spool member 40.

The coil surrounds the magnet and an electrical current is induced therein upon movement of the coil relative to the magnet. The current in the coil is conducted by way of leads 64 and 66 to clips 68 and 70 which are clipped to spacers 72 and 74. Coiled flex leads 76 and 78 are connected between clips 68 and 70 and clips 80 and 82 on spacers 81 and 83, the clips being connected to leads 84 and 86 leading externally of the housing. The spacers 72, 74, 81 and 83 are threaded and act as lock nuts on the respective screw members. Static balancing of the rotor is accomplished in three planes by adding weights to the sides of the rotor and the torque of the flex leads 76 and 78 is nulled by rotatably adjusting the spring clips 68 and 80 and 70 and 82. The mechanism is enclosed by the cover 87 which may be attached to base 25 by screw threads 88.

The pivotal coil assembly acts as a rotor rotating with the air frame of the missile. Upon a change in attitude of the longitudinal or rolling axis of the missile the pivotal coil assembly acts as a gyro with the coil precessing or moving with respect to the magnet thus generating a voltage which is proportional to the rate at which magnetic lines of force are being cut by the coil and in phase with the rotation of the body. Thus the coil assembly oscillates about its pivot axis at the frequency of rotation of the body. The EMF output of the sensor is directly proportional to the input steering rate to the air frame. Interaction of the electrical conducting material (aluminum) rotor and the magnetic field act to dampen the rotor or coil. The parameters of the apparatus can be adjusted to the sensitivity desired or necessary for the particular air frame or other application.

Figure 6:
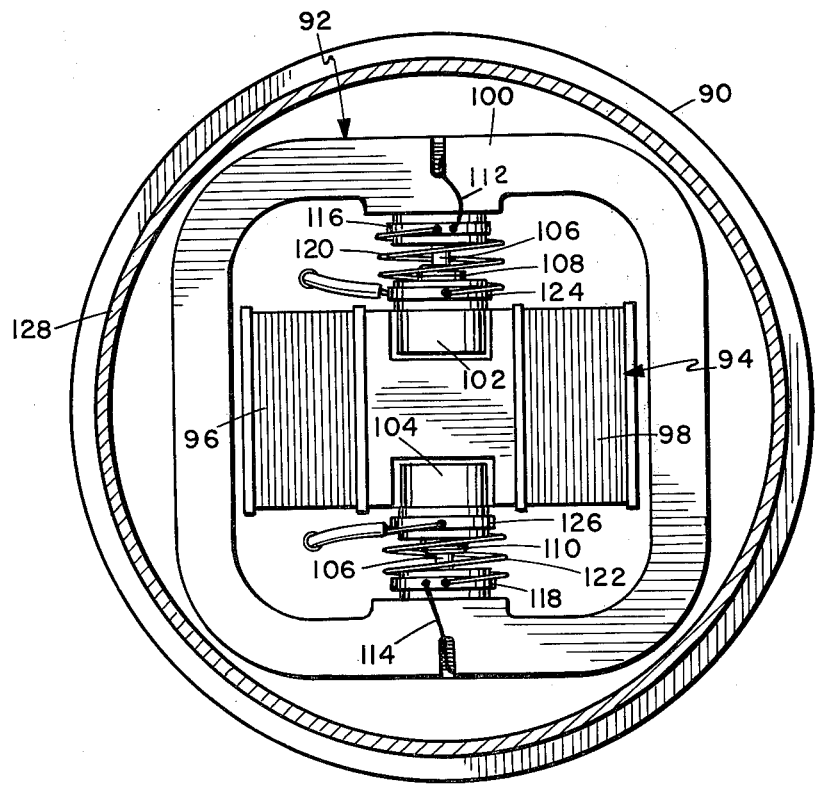
FIG. 6 is a front view of a sensor with the cover cut away, showing an alternate coil and magnet configuration.

Turning now to FIG. 6 of the drawing, there is illustrated an alternate embodiment of the invention, wherein a base member 90 supports a coil generally designated by the numeral 92 which is pivotally mounted for movement relative to a fixed electromagnet 94. The electromagnet 94 is secured to the base 90 in a suitable manner and includes the usual core on which are wound coils 96 and 98. An electrical current in the coils 96 and 98 creates a magnetic field which is cut by the movement of coil 92. The coil 92 is of a generally square or rectangular configuration, in this embodiment, comprising a coil of wire wound upon a frame member 100, which is of a suitable material such as aluminum and is supported by means of bearings, as previously described, on a pair of trunion support members 102 and 104, which are secured to and extend upward from the base 90. The coil 100 is supported on pins 106 extending into bearings in screw members 108 and 110 mounted in the trunion members 102 and 104. The conduction of current from the coil 100 is accomplished by the connection of leads 112 and 114 to clips 116 and 118 which in turn are connected by way of coiled wire leads 120 and 122 to clips 124 and 126 connected to the output leads as in the previous embodiment. Current to the electromagnet can be varied as a function of acceleration, rate, position, temperature, time, altitude (pressure), etc., for error correction or compensation.

Damping can be varied by changing the dimensions of the conductive material of the coil spool, or by changing the material, say to copper. This would vary the shorted turn/eddy current damping present in the system. Since the entire apparatus is enclosed by a cover 128, such as that illustrated in the previous embodiment, the entire assembly may be filled with a suitable damping fluid for greater damping if desired.

While the present invention has been described and illustrated by specific embodiments, it is to be understood that numerous changes and modifications may be made therein without departing from the spirit and scope of the invention as defined in the appended claims.

Having described our invention, we now claim:

1. A steering rate sensing device adapted for use on a rotating body comprising:

a base member including pivot support means fixed thereto for attachment directly to a rotating body for rotation therewith about a rotary axis, said pivot support means defining a pivot axis extending at an angle to said rotary axis, magnetic means fixed to said base member for rotation therewith, and a pickoff coil pivotally mounted on said pivot support means on said base member for rotation therewith, and for movement about said pivot axis relative to said magnetic means by gyroscopic precession in response to change in orientation of said rotary axis during rotation thereof for generating a signal.

2. The steering rate sensing device of claim 1, wherein said magnetic means is a permanent magnet.

3. The steering rate sensor of claim 1, wherein said magnetic means is an electromagnet.

4. The steering rate sensor of claim 3, wherein said pivotal axis of said coil intersects said rotary axis at a right angle thereto.

5. The steering rate sensor of claim 1, wherein said pivot axis is transverse to said rotary axis.

6. The steering rate sensor of claim 5, wherein said coil encircles said magnetic means.

7. The steering rate sensor of claim 6, wherein said coil is circular in configuration.

8. The steering rate sensor of claim 6, wherein said coil is generally rectangular in configuration.

9. The steering rate sensor of claim 1, wherein the axis of said base coincides with the rotary axis of said rotating body.

10. The steering rate sensor of claim 1, including damping means for damping the pivotal movement of said coil.

11. The steering rate sensor of claim 10, wherein said damping means comprises conductive material carried by said coil for enhancing shorted turn/eddy current damping thereof.

12. The steering rate sensor of claim 1 mounted in a rolling air frame having a predetermined induced roll about its longitudinal axis, thereby defining said rotary axis, said base member being fixed to said air frame, said pickoff coil being mounted for pivotal movement about said pivot axis at an angle intersecting said air frame rotary axis at right angles thereto.

13. The steering rate sensor of claim 1, wherein said sensor is enclosed by a cover made of a low reluctance magnetic material for defining a shield for shielding said sensor from external magnetic fields, for shielding adjacent areas from the sensor magnets, and for maximizing flux density within the sensor.

14. A steering rate sensing device for a rotating body comprising:

a base member including trunion support bearings defining a pivot axis mounted in a rolling air frame having a predetermined induced roll about its longitudinal axis, thereby defining a rotary axis, said base member being fixed to said air frame, for rotation therewith about said rotary axis, said pivot axis intersecting said air frame rotary axis at right angles thereto, magnetic means fixed to said base member for rotation therewith, and a pickoff coil comprising a conductive wire wound circumferentially about an annular spool pivotally mounted on said base on said trunion support bearings for rotation therewith, and for movement relative to said magnetic means by gyroscopic precession in response to change in orientation of said rotary axis during rotation thereof for generating a signal.

15. The steering rate sensor of claim 14, wherein said coil is balanced about said pivot axis and said rotary axis.

16. The steering rate sensor of claim 14, including electrical conducting means for conducting electrical current from said coil past said trunion support bearings, said conducting means comprising a pair of nonconductive spacers disposed on opposite sides of each of said bearings, a conductive spring clip engaging each spacer, a conductive lead from said coil connected to one of said clips, an external lead connected to the other of said leads, and a flex lead connected between said clips.

17. The steering rate sensor of claim 15, wherein said spacers are generally disc shaped in configuration and are mounted coaxially of said trunion bearings.

* * * * *

UNITED STATES PATENT AND TRADEMARK OFFICE
CERTIFICATE OF CORRECTION

PATENT NO. : 4,114,451
DATED : September 19, 1978
INVENTOR(S) : Jack H. Crittenden and Joseph W. Bitson It is certified that error appears in the above–identified patent and that said Letters Patent are hereby corrected as shown below:

In the specification, Column 1, line 48, delete "4,008,00," and substitute --4,054,254--.

Signed and Sealed this

Twenty-sixth Day of December 1978

[SEAL]

Attest:

RUTH C. MASON
Attesting Officer

DONALD W. BANNER
Commissioner of Patents and Trademarks